United States Patent
Citerin et al.

(10) Patent No.: US 11,921,416 B2
(45) Date of Patent: Mar. 5, 2024

(54) METHOD, DEVICE, AND NON-TRANSITORY COMPUTER-READABLE MEDIUM FOR SETTING PARAMETERS VALUES OF A VIDEO SOURCE DEVICE

(71) Applicant: Milestone Systems A/S, Brøndby (DK)

(72) Inventors: Johann Citerin, Tregueux (FR); Romain Bellessort, Rennes (FR)

(73) Assignee: MILESTONE SYSTEMS A/S, Brøndby (DK)

( * ) Notice: Subject to any disclaimer, the term of this patent is extended or adjusted under 35 U.S.C. 154(b) by 162 days.

(21) Appl. No.: 17/606,721

(22) PCT Filed: Sep. 17, 2020

(86) PCT No.: PCT/EP2020/075973
§ 371 (c)(1),
(2) Date: Oct. 26, 2021

(87) PCT Pub. No.: WO2021/053069
PCT Pub. Date: Mar. 25, 2021

(65) Prior Publication Data
US 2022/0236625 A1 Jul. 28, 2022

(30) Foreign Application Priority Data
Sep. 17, 2019 (GB) .................... 1913412

(51) Int. Cl.
*G03B 7/091* (2021.01)
*G03B 7/28* (2021.01)
(Continued)

(52) U.S. Cl.
CPC .............. *G03B 7/091* (2013.01); *G03B 7/28* (2013.01); *H04N 23/62* (2023.01); *H04N 23/71* (2023.01); *H04N 23/72* (2023.01)

(58) Field of Classification Search
CPC .............................. G03B 7/097; H04N 23/72
See application file for complete search history.

(56) References Cited

U.S. PATENT DOCUMENTS

2018/0350106 A1* 12/2018 Kasilya Sudarsan ....................... H04N 23/633
2020/0221009 A1* 7/2020 Citerin .................. H04N 23/64

FOREIGN PATENT DOCUMENTS

| EP | 3113483 A2 | 1/2017 |
|---|---|---|
| GB | 2570448 A | 7/2019 |

(Continued)

*Primary Examiner* — Noam Reisner
(74) *Attorney, Agent, or Firm* — Canon U.S.A., Inc. IP Division

(57) ABSTRACT

A method for setting parameters values of a video source device comprising obtaining a value of an image characteristic for a current image generated by the video source device set with initial parameters values; determining a satisfaction level for the image characteristic of the current image based on the obtained value, the satisfaction level representing a probability to fulfil a task; obtaining a set of candidates, a candidate being defined as a set of parameters values; for each candidate, predicting an evolution of the satisfaction level for the image characteristic relatively to the satisfaction level determined while the video source device is set with the initial parameters values; selecting a candidate based on its predicted evolution of the satisfaction level; setting the parameters values of the video source device using the set of parameters values of the selected candidate.

13 Claims, 9 Drawing Sheets

(51) Int. Cl.
*H04N 23/62* (2023.01)
*H04N 23/71* (2023.01)
*H04N 23/72* (2023.01)

(56) References Cited

FOREIGN PATENT DOCUMENTS

JP      2016213660 A   12/2016
JP      2019101320 A    6/2019

\* cited by examiner

METHOD, DEVICE, AND NON-TRANSITORY COMPUTER-READABLE MEDIUM FOR SETTING PARAMETERS VALUES OF A VIDEO SOURCE DEVICE

CROSS-REFERENCE TO RELATED APPLICATIONS

This application is the National Phase application of PCT Application No. PCT/EP2020/075973, filed on Sep. 17, 2020 and titled "METHOD, DEVICE, AND COMPUTER PROGRAM FOR SETTING PARAMETERS VALUES OF A VIDEO SOURCE DEVICE"". This application claims the benefit under 35 U.S.C. § 119(a)-(d) of United Kingdom Patent Application No. 1913412.1, filed on Sep. 17, 2019. The above cited patent applications are incorporated herein by reference in their entirety.

FIELD OF THE INVENTION

The present invention relates to a method, device and non-transitory computer-readable medium for setting parameters values of a video source device.

BACKGROUND OF THE INVENTION

Video-surveillance is based on cameras that are expected to record live footage with an image quality that is sufficient to fulfil its task or mission (e.g., being able to recognize a human person, or being able to read a license plate are common requirements), without leading to excessive resource consumption (bandwidth and recording resource in particular).

Independently from the camera model, quality and resource consumption depend a lot on the camera parameters values, with huge differences between a camera with optimal parameters values vs a camera with default parameters values or, worse, with inadequate parameters values.

In order to modify the camera parameters values, the following methods are used but with some drawbacks:
- Manual settings. Fixing the parameters values by the installer is a common procedure. However, it is costly since it requires a long installation time with a trained staff, several hours are sometimes necessary for a good setting in some cases. It is also not dynamic, which means that the fixed parameter may fail when conditions change (e.g. summer/winter). This is also sometimes difficult since the cameras menus are completely different from one camera to the other, which limits the number of cameras a staff is trained on.
- Embedded auto-settings. There are usually auto-exposure methods in the modern cameras. However, they may encounter some motion blur or some targets contrast issues, which is the reason why they actually work only in the most common cases (good lighting, slow moving targets). Some new, high-end cameras are equipped with target-detection hardware that makes it possible to have some more accurate auto-setting, as they are able to recognize the important parts of an image (the targets). However, this requires expensive additional embedded sensors and hardware that make it not an economic and realistic solution in most cases.
- Automated settings based on thorough calibration (e.g. measurements are made for every possible combination of parameters values). Errors may occur during calibration, and external elements may change significantly over time when compared to elements observed at calibration time. Therefore, such solutions lead to predictions that are not robust enough as they are too dependent on calibration data.

SUMMARY OF THE INVENTION

Consequently, the known methods have such drawbacks that it is of interest to propose a method with reduced costs, i.e. not requiring complex and costly hardware or long time of specialized technician, versatile, i.e. easily adaptable to different types of camera or environments, or able to modify the parameters values due to environment modification without human intervention.

The present invention has been devised to address one or more of the foregoing concerns.

In a first example embodiment, a method for setting parameters values of a video source device comprises:
  obtaining a value of an image characteristic for a current image generated by the video source device set with initial parameters values;
  determining a satisfaction level for the image characteristic of the current image based on the obtained value, the satisfaction level representing a probability to fulfil a task;
  obtaining a set of candidates, a candidate being defined as a set of parameters values, each candidate being different from the other candidates of the set by a different value of at least one parameter;
  for each candidate, predicting an evolution of the satisfaction level for the image characteristic relatively to the satisfaction level determined while the video source device is set with the initial parameters values;
  selecting a candidate based on its predicted evolution of the satisfaction level;
  setting the parameters values of the video source device using the set of parameters values of the selected candidate Accordingly, the method advantageously uses an automatic method based on image characteristics to optimize the parameters values of the camera.

This embodiment may comprise other features, alone or in combination, as disclosed in dependent claims 2 to 12.

Among the advantages of these features, there are a progressive approach using an iterative method which converges quickly, the learning capabilities of the prediction functions over time, a fast setting of the video source, a generic and auto-adaptive approach which can be used on a large variety of video sources or installations, a fast and user-friendly installation.

According to a second aspect of the invention there is provided a computer program product for a programmable apparatus, the computer program product comprises a sequence of instructions for implementing each of the steps of the method here above when loaded into and executed by the programmable apparatus.

According to a third aspect of the invention there is provided a non-transitory computer-readable storage medium storing instructions of a computer program for implementing each of the steps of the method described above.

According to a fourth aspect of the invention there is provided a device for setting the parameters values of a video source, the device comprising a processing unit configured for carrying out some or all of the steps of the method described above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Compared to the known methods, a better method would automatically find the optimal camera parameters values, with no need for a thorough calibration. It would include the following features:

Software-based. If it does not require any specific hardware, it is possible to run the method in some external servers, which would make it applicable to all cameras at low cost, including the old, legacy cameras.

No thorough calibration. A thorough calibration process being used to perform numerous measurements once and for all is not wise. The first reason is that it makes the installation process slow and requires the presence of the installation staff, which is not a good commercial feature. The second reason is that it creates some fragile system, since many errors are possible during a thorough calibration. Any model requiring a complex calibration is therefore less likely to provide a robust solution. Moreover, if the scene content changes, it is very likely that the information gathered during the calibration is not true anymore. A better method would only use a fast initial calibration step, more like some early data gathering to evaluate a trend of how a given measurement may be impacted when a given parameter is modified, to help accelerate camera readiness, but it should not rely on this data for a long time.

Fast. The auto-setting should be able to react quickly to new changes and have a fast convergence toward a good setting.

Generic. The auto-setting method should be able to adapt to an unknown camera model, and to any scene. Since it should not be based on a thorough calibration, it means that the auto-setting method should have some learning capability, making it able to adapt to any scene.

Scalable. Different cameras may have different settable parameters. The auto-setting solution thus should be easily expandable to new parameters, with no need to substantial changes in the method. It means that the method principles should be very generic, and be the same for all parameters.

Auto-adaptive. The auto-setting method should be able to change and adapt when scene content changes over time. In other words, it should continuously update its underlying behavior by learning from the environment, making it a more robust solution.

In the following, a new auto setting method is disclosed that shares those features and solves the prior issues when coming to cameras auto-setting.

Figure 1:
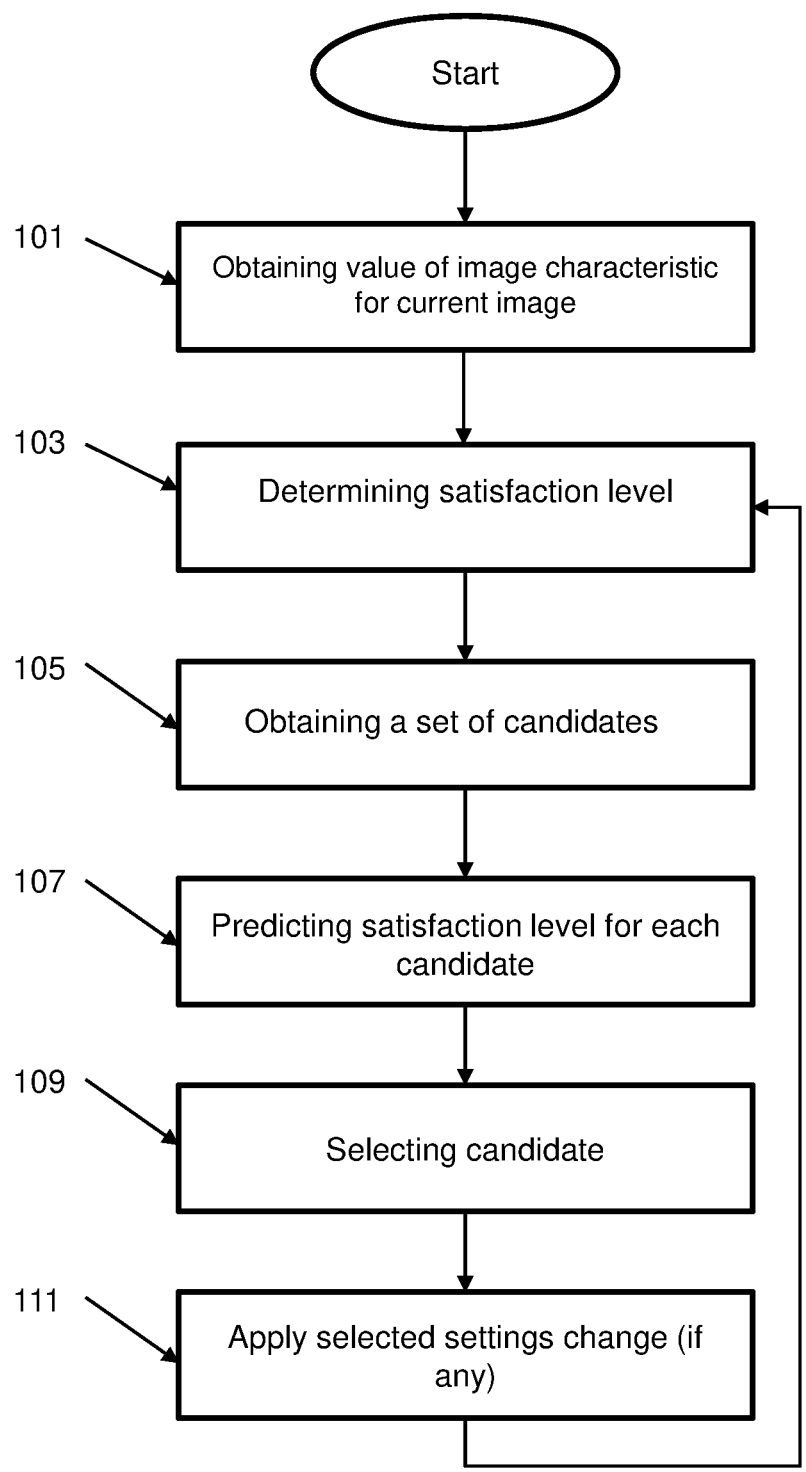
FIG. 1 illustrates an embodiment of a method for setting parameters values of a video source device.

In reference to FIG. 1, a method for setting parameters values of a video source device comprises:
- obtaining 101 a value of an image characteristic for a current image generated by the video source device set with initial parameters values;
- determining 103 a satisfaction level for the image characteristic of the current image based on the obtained value, the satisfaction level representing a probability to fulfil a task;
- obtaining 105 a set of candidates, a candidate being defined as a set of parameters values, each candidate being different from the other candidates of the set by a different value of at least one parameter;
- for each candidate, predicting 107 an evolution of the satisfaction level for the image characteristic relatively to the satisfaction level determined while the video source device is set with the initial parameters values;
- selecting 109 a candidate based on its predicted evolution of the satisfaction level;
- setting 111 the parameters values of the video source device using the set of parameters values of the selected candidate.

A video source device is any device able to provide a stream of video data from a scene. Particularly, a video camera, or camera in-short, is a video source device. The following embodiment uses a camera as a specific video source device.

Typically, camera parameters are attributes of the camera that can be set through a camera API, and that are automatically set through the method. Examples of camera parameters are gain, shutter, iris and encoding. In practical discussions of digital cameras and scanning devices, gain is described as a means of increasing the ISO of the device and apparent sensitivity to light. In more technical terms, gain in a digital imaging device represents the relationship between the number of electrons acquired on an image sensor and the analog-to-digital units (ADUs) that are generated, representing the image signal. Increasing the gain amplifies the signal by increasing the ratio of ADUs to electrons acquired on the sensor. The result is that increasing gain increases the apparent brightness of an image at a given exposure.

The list of camera parameters may depend on cameras. For instance, not all cameras allow controlling values of gain, shutter and iris. And even for cameras that do, it may be decided to use a fixed value for one parameter (e.g. iris) and to use the method to control the values of other parameters (e.g. gain and shutter).

An image characteristic is a property of an image that can be measured with a metric. Corresponding measurement makes it possible to assess the satisfaction level. In the following specification, an image characteristic may also be called a criterion. For instance, contrast is a criterion/image characteristic for image quality corresponding to a good balance between dark/bright areas in an image. Other examples are noise, motion blur, iris blur, encoding artefacts and bandwidth.

Depending on the task to fulfil or depending on the characteristic of the camera to configure, the method may use one or a plurality of image characteristics.

At each image characteristic is associated a so-called satisfaction level, e.g., ranking between [0, 1] and representing a probability to fulfil a task. Indeed, depending on the task to be fulfilled, the impact of each image characteristic may vary. As an example, for some tasks, noise may be a significant issue, while for other tasks, noise may be less of an issue. A satisfaction level of 0 means that, according to the model, the task cannot be fulfilled, whereas a satisfaction level of 1 means that the task can certainly be fulfilled. Practically, such model may not be 100% accurate, hence a level of 0 more generally means that the task is very unlikely to be fulfilled, and a level of 1 that the task can almost certainly be fulfilled. In particular, it should be noted that the satisfaction level only reflects the probability to fulfil a task from the point of view of a considered/given image characteristic. Yet, parameters that are not image characteristics may also affect the capability to fulfil the considered task. For instance, in the case where the task to be fulfilled consists in identifying people, even though the satisfaction levels for all considered image characteristics may be equal to 1, it may happen that a person cannot be identified e.g., because her face is covered or hidden.

Each satisfaction level is calculated by using an estimation function for each image characteristic, called $f_{estimation_{crit}}$. This function calculates the satisfaction level for one image characteristic crit as a function of some attributes that characterize the current state of the camera and the current image. There can be as many attributes as required for deriving all of the $f_{estimation_{crit}}$ functions. Attributes must be computable from the information available from the camera, i.e., from the camera parameters values and from the image.

The values of all attributes are sufficient to completely characterize the current state of the camera and all corresponding satisfaction levels, which is why the set of all attributes and their respective values are called a state. Each $f_{estimation_{crit}}$ is provided beforehand, as a given model of satisfaction for each image characteristic crit.

A candidate is a set of camera parameters values to be considered among all possible parameters values choices. Each candidate has a unique value for the set of camera parameters values.

And the set of candidates is the manifold of all possible candidates. At any given time, the camera parameters values correspond to one single candidate among all candidates, and when a camera changes its parameters values, the new parameters values correspond necessarily to one of the candidates.

For each candidate and each criterion, a prediction function called $f_{prediction_{crit}}$ predicts the improvement of the satisfaction level for that criterion, as compared to the current state.

A particular scoring formula makes it possible to calculate a score for each candidate, each criterion, based on the values of current satisfaction levels, and the predicted improvements for that candidate. Finally, each candidate is attributed a global score that is simply the sum of all of the criterion-score. The candidate with a maximal score may be selected as the best set of parameters values, and the camera parameters values may be changed accordingly.

The different steps of the method will now be disclosed with some implementation details.

A first stage called 'calibration stage' is an initialization stage where some data are gathered to speed up the convergence of the updating process. This stage may be optional as the method may start with any candidate and iterate until it finds the candidate offering the best satisfaction level.

The calibration stage is used to gather some starting data, to initialize scene variables, light measurement function, and the prediction functions as explained below. It may also be used to find a normalized scale for the parameters that play a role in the contrast criterion, namely the gain, shutter and iris parameters. All of those functions and variables may be updated afterwards, during the normal course of operations, so the calibration stage does not need to be particularly accurate.

Figure 2:
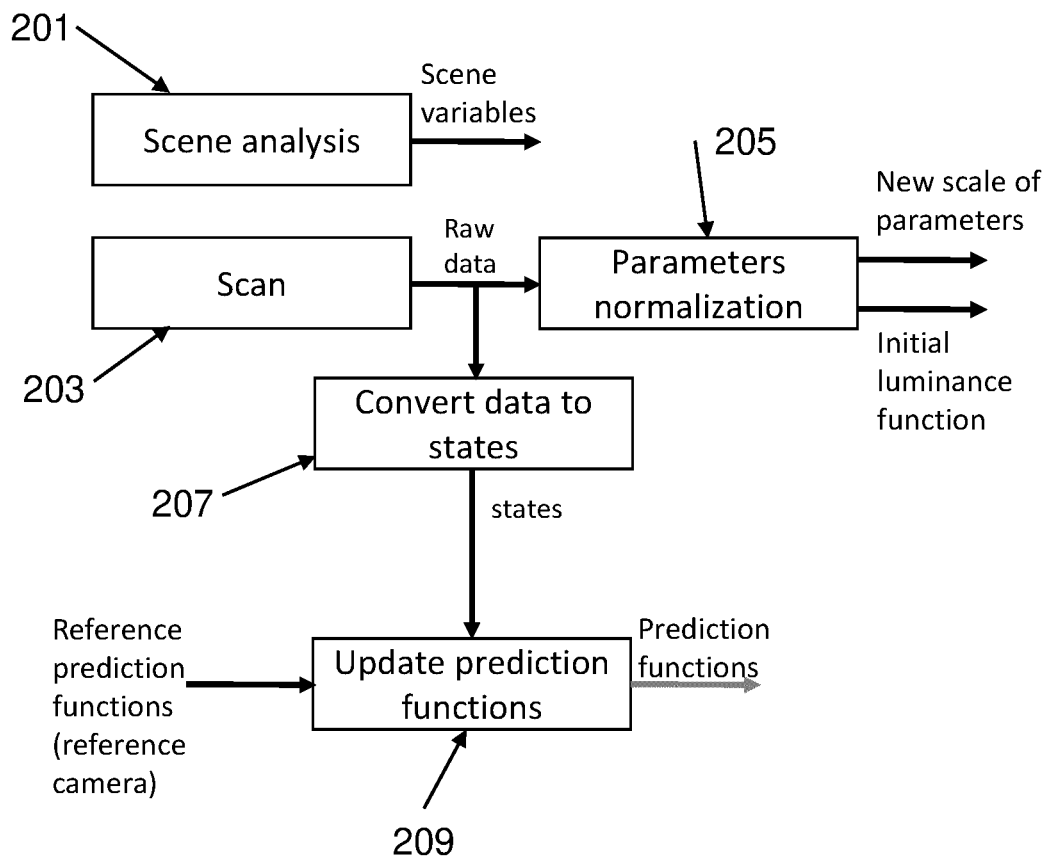
FIG. 2 illustrates a workflow of the calibration stage for an embodiment of the setting method.

FIG. 2 shows a workflow of the calibration stage.

In the following, we describe the calibration steps more in-depth.

Scene analysis step 201 analyzes some videos (if any) recorded by the camera prior to the auto-setting initialization. If no footage is available, this step may be skipped and some default values may be used (e.g., set by the user), to be updated during the operation stage following the calibration stage, i.e., when the camera is functional and in operation, by using the running footage of the camera.

The scene analysis may be particularly useful to compute the following scene variables:
  Target velocity, i.e., the mean, or median or any function representative of the distribution of velocities of the targets observed in the scene. Estimation of target velocity may be done by using a target detection method (e.g., based on deep learning) plus some detection of points of interest within the targets plus a tracking method of the detected points of interest;
  Target size: a detection method (e.g., based on deep learning), e.g., the same as for target velocity, may be sufficient.

These variables may be of interest or not depending on the task or mission associated to the camera.

Some parameters are involved jointly in some calculations, for instance gain, shutter and iris may be used for the "exposure" calculation that is used for contrast:

Exposure=gain+shutter+iris+light

Where light stands for the quantity of light coming from the scene captured by the camera. All terms of the equation have an influence on the light quantity arriving to the camera receptor, and therefore affect exposure.

All the parameters that are jointly involved in such calculation need to be normalized along a common scale.

A quick scan of each of those parameters may be performed and recorded as raw data during the scan step 203.

Here, a "scan" of one parameter parameter, consists in choosing one particular starting value for parameter$_i$, measuring all of the attributes that constitute the current state, choosing another value of parameter$_i$, measuring the state again, and proceed again until all, or a subset of, available values of parameter$_i$ have been analyzed.

During the scan of parameter$_i$, the values of the other parameters parameter$_{j \neq i}$ are set fixed to values such that the values of contrast during the scan span the maximum scale. In another embodiment, we choose several values of parameter$_{j \neq i}$ and repeat some of the values of parameter$_i$, so as to increase the different values of contrast reached during the scan.

Each camera has its own scale with its own raw units for gain and iris, that is usually not the same as the scale for shutter. Therefore, a normalized scale for gain, iris and shutter, may be used for contrast calculation. The parameters normalization step 205 consists in finding, for each raw unit, the lookup table between each raw value and the corresponding normalized value.

As an example, detailed computation for this step comprises the following.

Gain and iris have raw units that may be arbitrary, and different for each camera. Fortunately, shutter is always in time units, which is a universal unit available for all cameras.

The effects of shutter on exposure are logarithmic rather than linear. For example, the effects of multiplying shutter by 2 will be the same if the initial image is the same, whatever the shutter amplitude. In order to use summations rather than multiplications, it may be better to use a logarithmic scale in dB (decibel) rather than the original time units for shutter. Any logarithmic scale may work; for example, we can choose to use the decibel (dB) unit or a similar unit for shutter. For example, an appropriate scale could be such that: shutter2=2*shutter1 (time units) becomes: shutter$_2$=shutter$_1$+6 dB (dB units). The lookup table may be calculated between the raw units of shutter (s or µs) and the normalized units (dB), for example by using the following formula:

$$\text{shutter}_{dB} = 6 * \log_2(\text{shutter}_{time(s)})$$

Or, similarly:

$$\text{shutter}_{dB} = 20 * \log_{10}(\text{shutter}_{time(s)})$$

A same scale for gain and iris as for shutter may be used by identifying the gain and iris transitions from a value to another value that has the same impact on the image as some transition in shutter. The luminance L may be used as the metrics to assess the "same impact" on the image. Luminance is here defined as a scalar value that can be calculated from an image and that somehow represents the intensity of light in the considered image. As an example, it may be calculated as the sum of the values for each channel of an RGB image, typically ranging between 0 and 765 given that each channel ranges between 0 and 255. So the changes in the scale of gain and iris are such that the following relationship is always true:

$$L_2(L_1, \Delta\text{shutter}) = L_2(L_1, \Delta\text{gain}) = L_2(L_1, \Delta\text{iris}) \text{ with}$$
$$\Delta\text{shutter}_{dB} = \Delta\text{gain} = \Delta\text{iris}$$

This formula means that for each transition Δshutter in dB units where luminance is increased from $L_1$ to $L_2$, the similar transitions Δgain and Δiris that also increase luminance from $L_1$ to $L_2$ shall have the same values as Δshutter in dB units.

One way to do this is to use the raw data to derive a luminance function $f_{luminance}$:

$$L = f_{luminan}(\text{shutter})$$

where shutter is in dB units

Then the gain and iris scales (here a "scale" may simply be a lookup table between the raw data and the normalized data) are chosen such that they use the same luminance function obtained with the shutter data:

$$L = f_{luminan}(\text{gain})$$

$$L = f_{luminan}(\text{iris})$$

This step provides a normalized scale for gain, iris and shutter, in the form of a lookup table associating each value of shutter, gain and iris with some values in dB Since all attributes have been recorded, it is trivial to create some states for each value of the parameters that have been scanned (step 207).

Finally, for each state, the step "update prediction functions" 209 is used. This step is also used during operation and will be disclosed in detail below. As any update formula, it requires a start function. The initial value of the prediction functions may correspond to some reference function obtained from a reference camera. The initial reference data are preferably fully defined on a predetermined interval, which offers the advantage to obtain complete reference data, i.e., with no missing data on the whole scale. Using initial reference data allows performing a fast scan that does not provide a complete set of data.

Figure 3:
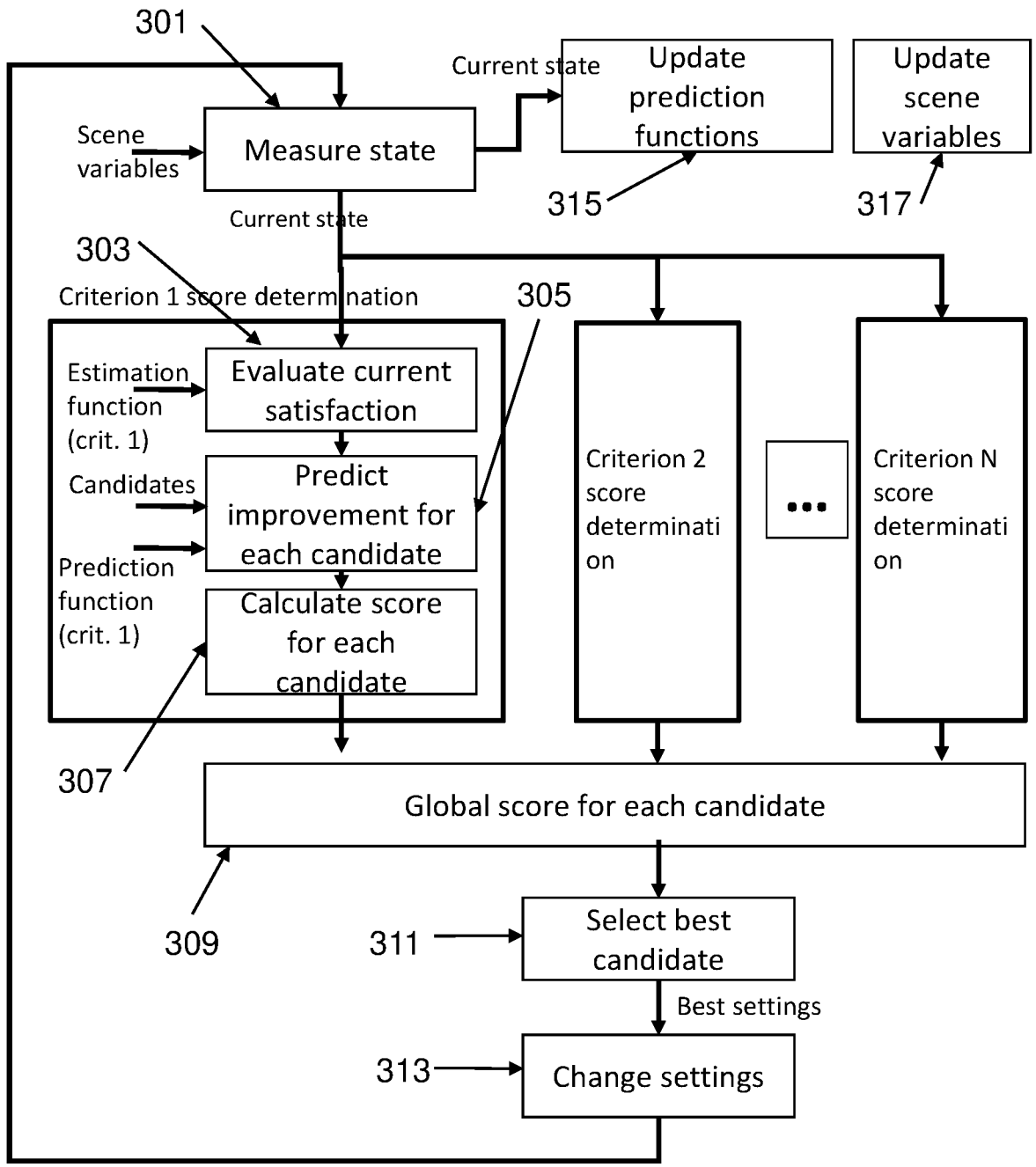
FIG. 3 illustrates a workflow of the operation stage for an embodiment of the setting method.

The workflow of operation stage is disclosed with reference to FIG. 3.

Operation stage has two purposes:
  Finding the optimal parameters values of the camera. This is the auto-setting part of the workflow (steps 301-313).
  Updating the functions and models to make sure that the algorithm is always adapted to the camera model and the current scene content. This is the auto-adaptive part of the operation stage (steps 315-317).

Each step of the operation workflow is further explained in the following.

The role of the "measure state" step 301 is essentially to update the "state" of the camera/scene.

The "state" is a set of updated information (also called attributes) that is sufficient for the next evaluation and prediction steps to be done. The state is intended to be a practical and complete representation of the current state of the camera and system, so as not to need any further image processing once the state is measured. The values of each attribute of the state are enough information for the whole auto-setting process to be performed. In particular, there can be as many attributes as required to be able to use the $f_{estimation}$ and $f_{prediction}$ functions.

The objective of the "measure state" step 301 is to obtain the current value of all attributes. To do so, the "measure state" step performs the following actions:
  The values of the camera parameters, as part of the set of attributes, are obtained. This is a trivial step as the method has a full control on the parameters values.
  Some values of attributes are measured from the current image of the camera or from a set of the last images, by using some image processing methods.

Values of some attributes are obtained through their respective prediction functions having as inputs only some parameters values and some additional specific scene variables. Usually, scene variables do not change frequently, so it is not necessary to measure them at each iteration. Instead, they are updated with their own frequency.

Depending on the attribute, it is worthwhile to note that an attribute may be measured in one implementation and be predicted in another implementation.

The state measurement step 301 is the only step that may require analyzing the current image. All subsequent steps may simply use the information in the state, and may not use the image anymore.

At step 303, for each image characteristic/criterion, the current satisfaction level may be evaluated by using an estimation function called $f_{estimation_{crit}}$. Each $f_{estimation_{crit}}$ is provided beforehand, as a given model of satisfaction for each criterion. A possible method for creating such a function is to gather a dataset comprising images with different values of criteria, to annotate each image with a score between 0 and 1 according to a given satisfaction measure, and then to infer, based on criterion values and associated scores, a function that maps criterion value to the score.

$f_{estimation_{crit}}$ computes the level of satisfaction of the criterion $S_{crit}$ as a function of some state attributes. However, it is best that it does not depend on the parameters values. Indeed, there is not enough information in the settings to have an accurate value of the satisfaction level, as the relationship between parameters and satisfaction level depend on the camera and the scene. However, for the sake of simplicity, we will use "state" as the input of the function, since the state contains all of the attributes that any $f_{estimation_{crit}}$ may need.

Figure 4:
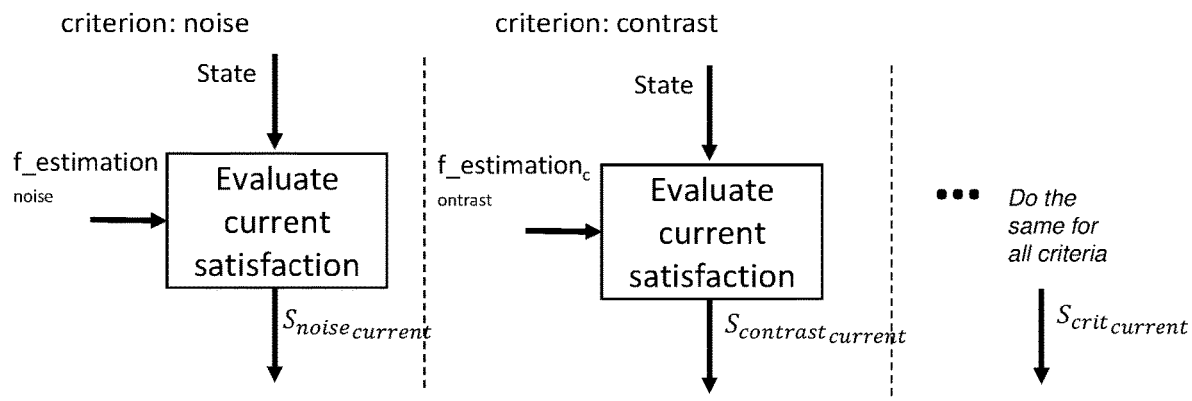
FIG. 4 illustrates a detailed workflow of the "evaluate current satisfaction level" step for the embodiment of FIG. 3.

FIG. 4 shows the workflow of the "evaluate current satisfaction level" step 303.

For each criterion, the evaluation of the current satisfaction itself may be done by using the estimation function:

$$S_{crit_{current}} = f_{estimation_{crit}}(state)$$

Example: for the noise and contrast criteria:

$$S_{noise_{current}} = f_{estimation_{noise}}(state) = f_{estimation_{noise}}(noise)$$

$$S_{contrast_{current}} = f_{estimation_{contrast}}(state) = f_{estimation_{contrast}}(contrast)$$

In those examples, even if $f_{estimation_{noise}}$ and $f_{estimation_{contrast}}$ take the state as input, they may not use all the attributes in the state, but only the "noise" attribute, and the "contrast" attribute, respectively.

Figure 5:
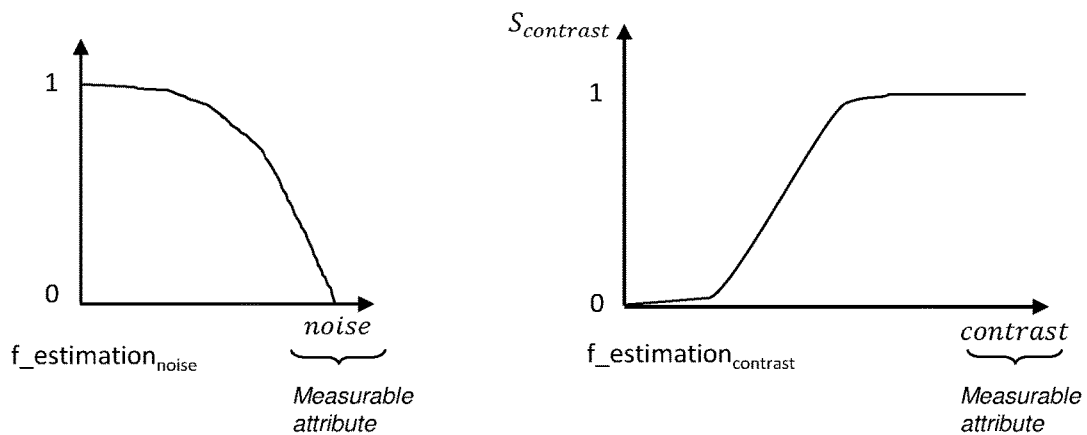
FIG. 5 illustrates some examples of estimation functions.

In FIG. 5, some mockup examples of $f_{estimation_{crit}}$ functions are provided, for the noise and for the contrast criteria.

Figure 6:
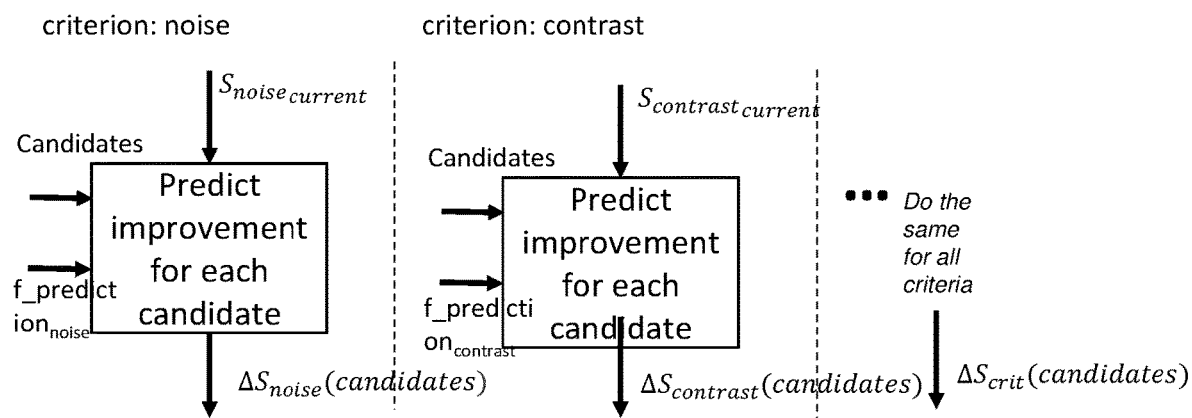
FIG. 6 illustrates a detailed workflow of the "prediction of improvement" step for the embodiment of FIG. 3.

At step 305, FIG. 3, prediction of the improvement is performed for each relevant criterion (e.g., for noise and for contrast). For a given criterion, the prediction of the improvement of each candidate of a set of candidates is performed. A detailed explanation of step 305 is disclosed in reference to FIG. 6.

As a reminder of definitions already stated, each camera may have multiple parameters, all of which form a large combination of possible parameters values. Usually, a camera can only be set to some particular values for each parameter; and it is best to consider that only some of them are reachable, thus making each parameter a discrete manifold. A set of camera parameters values to be considered among all possible parameters choices is called 'a candidate'. Each candidate is unique, and the list of all possible combinations is called 'the candidates' or 'the set of candidates'. At any given time, the camera parameters values correspond to one candidate.

Candidates can be described as absolute values or as delta compared to current values.

For example, with the 4 parameters (gain, shutter, iris, encoding), one possible candidate would be such set of values, expressed as delta values, like:

(Δgain=+12,Δshutter=0,Δiris=−6,Δencoding=0)

Another candidate would be:

(Δgain=+6,Δshutter=0,Δiris=+6,Δencoding=0)

And the following candidate also exists, that consists in changing nothing and staying at the current parameter values:

(Δgain=0,Δshutter=0,Δiris=0,Δencoding=0)

The whole manifold of possible changes of parameters will define the whole choice of candidates that are tested.

Since it is possible to choose arbitrarily which values of the parameters to include in the reachable values, there is some control over the number of candidates. The total number of candidates may have some influence on performance:

Too many candidates may reduce computational speed and stability/speed of auto setting convergence; but Too few candidates may reduce the choice of final states, which increases the risk of convergence toward suboptimal settings.

Candidates may be considered relatively to the current state. Using delta values has some advantages compared to absolute values, as it will be explained later.

To continue with the explanations of step 305, there is one prediction function for each criterion c: $f_{prediction_{crit}}$ It should preferentially be a 1D function, that calculates $S_{crit}$, the level of satisfaction for the criterion crit, as a function of a scalar value $A_{crit}$ for each candidate:

$$S_{crit} = f_{prediction_{crit}}(A_{crit}(candidate))$$

Since the only thing known about the candidates are their coordinates (their parameters values), $A_{crit}$ is derivable from the sole candidate parameters, or from derivatives of the parameters. Usually, Acrit is one parameter, or a linear combination of parameters and constants. Here, the word "constant" means a constant for all candidates.

EXAMPLES $$S_{noise}(candidate) = f_{prediction_{noise}}(A_{noise} = gain(candidate))$$

$$S_{contrast}(candidate) = f_{prediction_{contrast}}(A_{contrast} = gain(candidate) + shutter(candidate) + iris(candidate) + light).$$

In the noise criterion example, $A_{noise}$ is simply the gain parameter.

In the contrast criterion example, $A_{contrast}$ is the exposure, e.g. the sum of gain, shutter, iris and light. All of those variables but one are parameters, which are easily computable for each candidate. The last one is the light, which is known, and has the same value for all candidates (detailed explanation on light computation below). So, $A_{contra}$(candidate) is computable for all the candidates.

$f_{prediction_{crit}}$ may be n-dimensional, although it would take much longer for the "update prediction functions" to converge toward a stable, accurate state, so it is recommended to use 1-D functions if possible. In the rest of the description, it will be assumed that $f_{prediction_{crit}}$ are 1D functions.

So, at step 305, the evolution of the satisfaction level $\Delta S_{crit}$ (the so-called "improvement") expected from a modification of parameters {$\Delta$parameter} corresponding to each candidate c is predicted.

Due to the definition of $f_{prediction_{crit}}$, the improvement can be calculated by the formula $$S_{crit} = f_{prediction_{crit}}(A_{crit_{current}} + \Delta A_{crit}(c)) - f_{prediction_{crit}}(A_{crit_{current}})$$

An advantage to predict $\Delta S$ rather than S is to maximize the accuracy. All predictions have a risk to make some mistakes, whereas measurements are more robust. For this reason, it may be better to rely on the maximum amount of measurements, and on the least amount of prediction, for predicting satisfaction.

$$(candidate) = S_{measured_{current}} + \Delta S_{predicted}(candidate)$$

By using the above equation rather than (candidate)=$S_{predicted}$(candidate), prediction will only be used to derive the difference $\Delta S_{predicted}$ between current (measured) and candidate, which is strictly less than the whole value S. Even better, the disclosed method is a progressive method. The closer from the optimal solution, the smaller the $\Delta S_{predict}$(optimal_candidate), and the more accurate is the estimate of S(optimal_candidate). Since it is at the end, when close to the optimum, that the best accuracy is needed, this self-reinforcing-accuracy feature that improves a lot the effectiveness of the method.

To take into account the fact that the prediction functions may not be accurate at the beginning of the process or when the ambient light changes substantially, a refinement may be added to the computation of the improvement.

$f_{prediction_{crit}}$ functions may not be fixed. They may be refined based on made measurements. A very simple way to update these functions is to use interpolation based on measured points. In this case, $f_{prediction_{crit}}(A_{crit_{current}})$ is, by definition, equal to $S_{crit_{current}}$. Other methods to improve the prediction functions are disclosed below.

However, interpolation may not necessarily be the best way to refine $f_{prediction_{crit}}$. For instance, even though this does not happen frequently, it may occur that the camera does not actually apply indicated parameters values, in which case its images correspond to parameters values different from the indicated values. Therefore, in such cases, some invalid measurements are obtained. As another example, in some cases, camera may need a significant amount of time prior to reaching a stable image after new parameters values have been applied. More generally, it may therefore happen that a measurement is not valid, in which case $f_{prediction_{crit}}(A_{crit_{current}})$ should not be defined as $S_{crit_{current}}$. An example solution to this issue consists in considering not only the latest measured value for a given $A_{crit_{current}}$, but a median value, as described below in relation to the method to refine prediction functions.

Figure 7A:
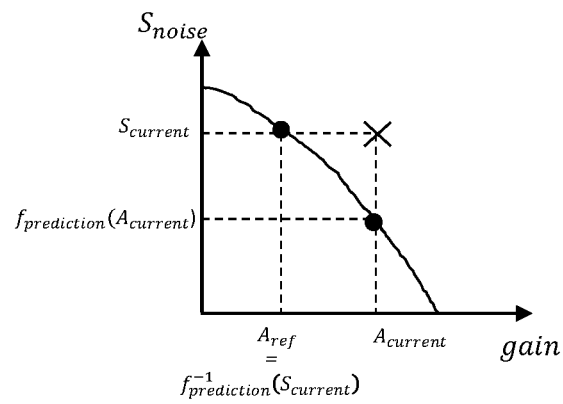
FIGS. 7A, 7B and 7C illustrate a method for refining prediction functions.

A consequence of this is that the formula for calculating $\Delta S_{crit}$ is not optimal in case of error with the prediction function. This is illustrated by FIGS. 7A, 7B and 7C, where noise is the exemplary criteria but the associated subscript is removed for readability reasons on majority of elements:

First, FIG. 7A provides an example where $f_{prediction}(A_{current})$ is not equal to $S_{current}$. Instead, as one can see, $S_{current}$ is obtained for a value $A_{ref}$ that is equal to $f_{prediction}^{-1}(S_{current})$.

Figure 7B:
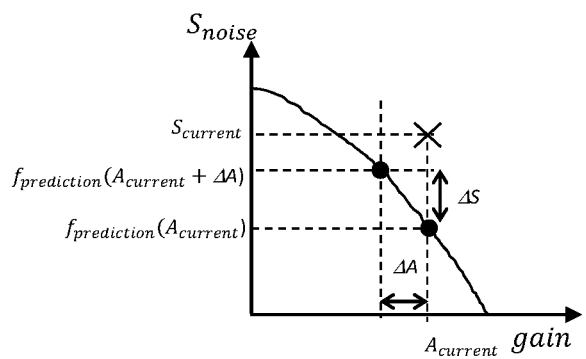

Second, FIG. 7B shows the value $\Delta S$ obtained for a given candidate that results in a variation $\Delta A$ based on above formula.

Figure 7C:
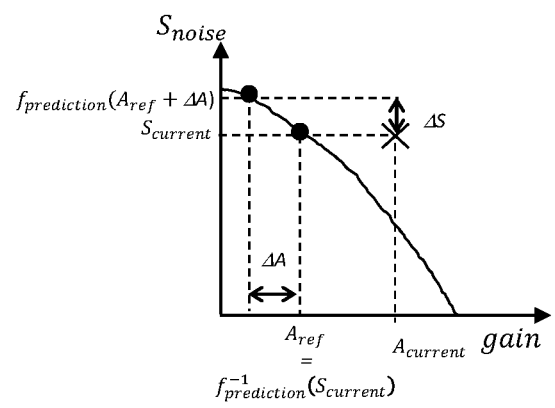

Third, FIG. 7C shows the value $\Delta S$ obtained for a given candidate that results in a variation $\Delta A$ based on a formula $\Delta S_{crit} = f_{prediction}(A_{ref} + \Delta A(c)) - S_{current}$ where $A_{ref} = f_{prediction}^{-1}(S_{current})$.

This new formula is more accurate. Typically, as one may see from the figures, previous formula may for instance result in unrealistic $\Delta S$ values. For instance, even if $S_{current}$ is equal to 0.8, a $\Delta S$ value greater than 0.2 may be calculated for a large $\Delta A$ value, which would be a serious error given that this score can obviously not be greater than 1. Therefore, using above formula in a case where $f_{prediction}(A_{current})$ is not equal to $S_{current}$ would lead the algorithm to believe that impossible gains may be obtained. Such errors cannot happen with the refined formula.

Conceptually, this new formula means that even though $f_{prediction}(A_{current})$ may be different from $S_{current}$, the evolution of S (i.e., $\Delta S$) based on an evolution of A (i.e., $\Delta A$) remains accurate.

As a remark, it may happen that $f_{prediction_{crit}}$ is not a bijection. In this case, there is an ambiguity for $f_{prediction_{crit}}^{-1}$. To overcome this ambiguity, the solution closest to the current value of $A_{crit}$ is selected.

Due to the update of the prediction functions, $f_{prediction_{crit}}$ accuracy improves, and becomes close to perfect with time. When $f_{prediction_{crit}}$ is perfect, $f_{prediction_{crit}}^{-1}(S_{crit_{current}}) = A_{crit_{current}}$. So, it is a reasonable assumption to consider that in case of multiple solutions, $f_{prediction_{crit}}^{-1}(S_{crit_{current}})$ closest to $A_{crit_{current}}$ should be selected, and this is an increasingly reasonable assumption with time.

Moreover, it has absolutely no consequence to select a bad solution since this situation is quite rare and will be corrected at the next iteration. Thanks to the update step, it is also an error that will never occur again.

The operation stage continues with step 307, FIG. 3, for calculating score for each candidate.

Figure 8:
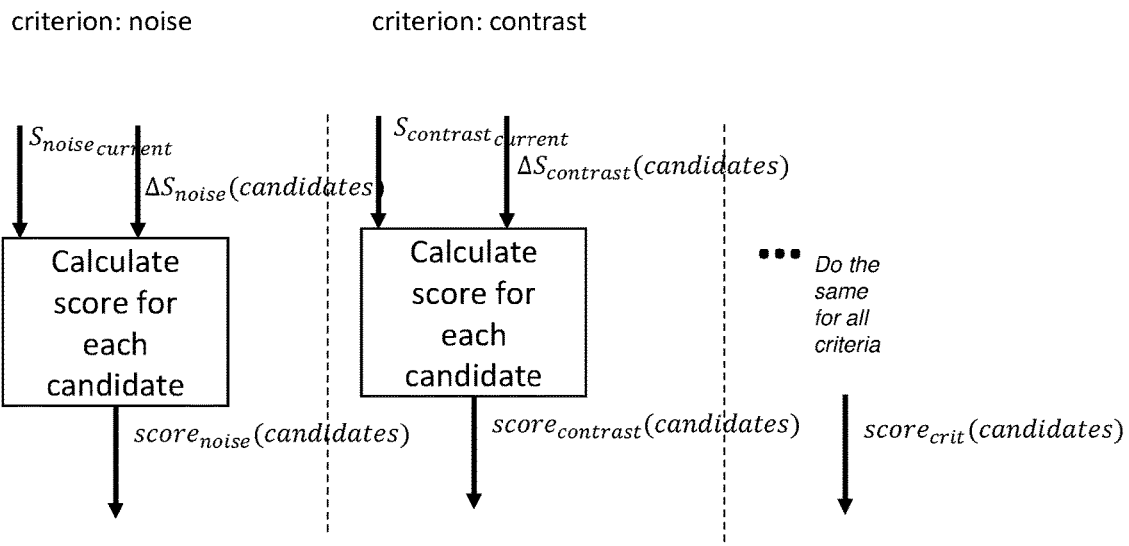
FIG. 8 illustrates a detailed workflow of the step for calculating scores of candidates of the embodiment of FIG. 3.

A score is associated to each criterion, and each candidate. It corresponds to how desirable is the candidate for this criterion, as compared to the current state, i.e. to how useful it is to decide to choose the candidate settings instead of the current settings, for the criterion, FIG. 8.

The scoring formula should have the following properties:

Scoring should reward more the candidates that improve more the criterion satisfaction, i.e., scoring should reward more the higher values of $\Delta S_{crit}$ Scoring should reward more the improvement of high priority criteria, and reward less the improvement of low priority criteria. High priority criteria are criteria that have low current satisfaction level $S_{crit}$. They weight much more on the perception of satisfaction. In other words, we need to reward more the lower values of $S_{crit_{current}}$;

Scoring should prevent the strong reduction of S, even when the criterion is currently low priority. By being reduced too much indeed, a low-priority criterion could be considered as a high priority criterion during the next iteration, which could lead to go back to the current level, thereby creating a strong risk of instability.

The following scoring formula fulfills those ideal properties:

$$\text{score}_{crit}(\text{candidate}) = \max(1 \underbrace{- S_{crit_{current}}}_{\text{Priority factor}}, \underbrace{1 - S_{crit_{current}} - \Delta S_{crit}}_{\text{Reduction prevention}}) \underbrace{\Delta S_{crit}}_{\text{Improvement factor}}$$

For instance, $\text{score}_{noise}(\text{candidate}) = \max(1 - S_{noise_{current}},$
$1 - S_{noise_{current}} - \Delta S_{noise}(\text{candidate}))\Delta S_{noise}(\text{candidate})$ Steps 303, 305 and 307 are applied for all criteria/image characteristics.

Then, at step 309, FIG. 3, all the criteria scores are synthesized into one global score for the candidate.

Since it may be considered that no criterion is more important than others, and the priorities have already been taken into account in the $\text{score}_{crit}$, a simple sum is sufficient.

A simple summation has the additional important property of being easily scalable to any number of criteria.

To add a premium for the current state (no change) in order to increase stability, the current state candidate may have a score $\epsilon$.

$\text{score}(\text{candidate}) = \Sigma_{criteria} \text{score}_{crit}(\text{candidate})$ $\text{score}(\text{candidate}=\text{current}) = \epsilon$ Step 311 of selection of the best candidate consists in taking the candidate with the best score.

$\text{best\_candidate} = \text{argmax}(\text{score}(\text{candidates}))$

And at step 313, the parameters values of the camera are changed, if necessary, at the camera level or through the camera API to apply the settings of the chosen candidate.

As explained here above, the prediction functions may be modified to adjust to some measurements, step 315.

Figure 9:
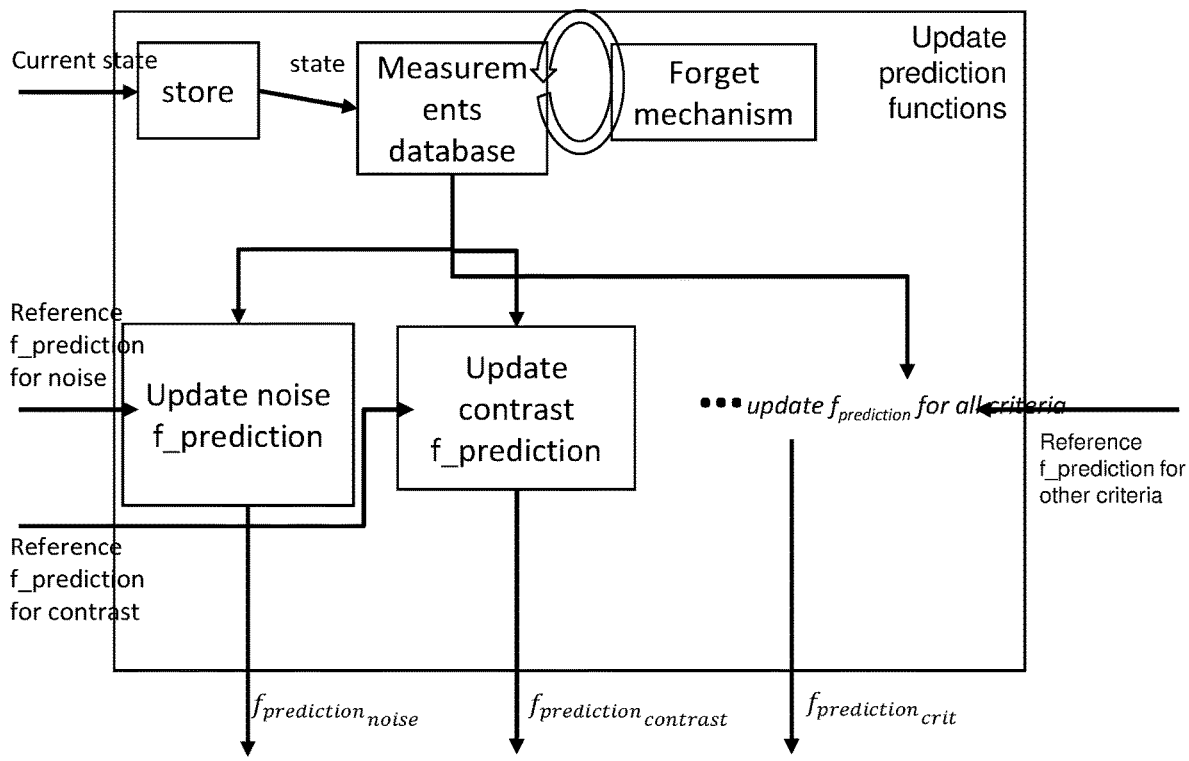
FIG. 9 illustrates a detailed workflow for updating prediction functions of the embodiment of FIG. 3.

The prediction functions updating workflow is displayed in FIG. 9.

It is a data-driven process, where we use all past information to derive the most accurate $f_{prediction_{crit}}$ possible.

After each state measurement, the new state is stored into a measurements database. A forget mechanism may be used to keep only the last, most relevant data and adapt to any significant change in scene content.

Then, each $f_{prediction_{crit}}$ is updated separately for each criterion.

The forget mechanism consists in keeping only the last measured data, for instance the last 30 minutes of transitions recording.

This makes sure that there is an adaptation to changing scenes, by removing any non-relevant data, i.e., data that were more likely to have different scene content.

However, since the number of measurements after the data removal may not be sufficient, only redundant data may be removed, e.g., the data that are close to the most recent data.

Each $f_{prediciton_{crit}}$ may preferably be a 1D function, which is easily modifiable by multiple methods. The simplest method may be to use an interpolation/extrapolation based on measured points. However, this method does not take advantage of the fact that the global shape of the function is known from the reference $f_{prediction_{crit}}$.

An example of a simple, yet accurate and fast-converging method that takes advantage of this knowledge, is described in the following.

There is an initial collection of points (from the reference $f_{prediction_{crit}}$)

One new point $(A_{crit}, S_{crit})$ is added for each measured state

Smart interpolation/extrapolation:

$$S(A) = S_{meas_1} + \left(\frac{S_{ref}(A) - S_{ref_1}}{S_{ref_2} - S_{ref_1}}\right) \times (S_{meas_2} - S_{meas_1})$$

where $(S_{meas_1}, S_{meas_2})$ correspond to points $(A_1, A_2)$ chosen in a similar way as interpolation/extrapolation If there are multiple $S_{meas}$ for the same A:
$S_{meas}(A_i) = \text{median}(\{, S_{meas_{A_i}}\})$ Another advantage of this method is that the use of median removes the measurement outliers, and the "smart" interpolation/extrapolation formula leads to a very fast convergence towards an accurate function, even with only few measurement points available.

At step 317 of the execution stage, scene variables may be updated.

Scene variables may be affected by the change in the scene content. Moreover, as the calibration stage must be quick and easy, some errors may have been made during the scene analysis part. If there were no prior footage available from the camera when the method is installed, there is not even any scene analysis step, and only some default values for the scene variables are used that need to be modified when more data will be available.

For those reasons, it may be preferred to proceed to a continuous update of the scene variables. The process is exactly similar to the scene analysis, except that no huge footage has to be analyzed completely, but only some footage that is recorded progressively.

In order not to consume too much resource, it is best to proceed only to a scarce updating, by using some random small recordings (video chunks), for example to use 10 seconds of recording once every 30 minutes.

Similarly, to what is done for $f_{prediction}$, a forget mechanism may remove all the old data, so as to only keep the most appropriate ones.

Figure 10:
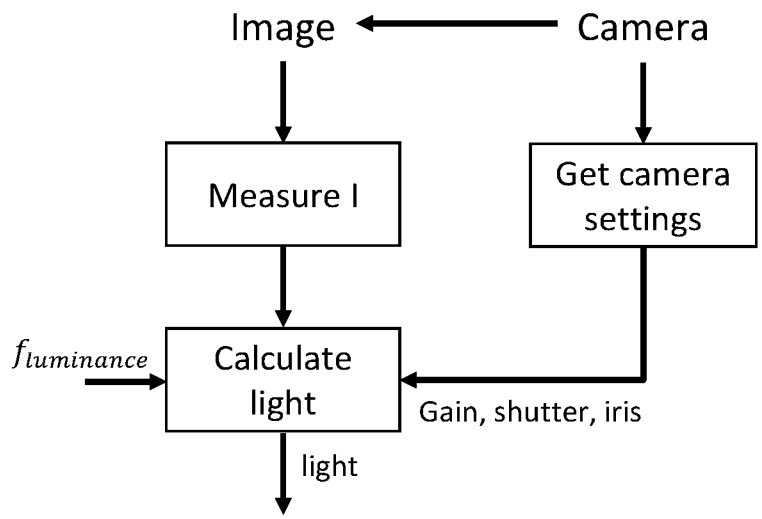
FIG. 10 illustrates a detailed workflow for measuring light.

The light measurement is one of the functions that is used during the "measure state" step. Contrary to the other measurement attributes, like noise, or contrast, the light measurement is quite specific, and no already existing method can be used. However, this measurement may help the accuracy of the method, so a method to measure the light is now disclosed (FIG. 10).

External lighting may have a profound effect on the image, especially on the image contrast. When all parameters are fixed (gain, shutter and iris especially), a light change will modify the contrast similarly to a gain, a shutter or an iris change would. Actually, gain, shutter, iris and light are attributes that have all exactly the same impact on contrast. It is possible to compensate for the decrease of each one by increasing another one, or by a combination of increases of the 3 others, and obtain the exact same contrast. It does not mean that all of those attributes are completely interchangeable: a high level of gain creates some noise, shutter creates motion blur, and iris creates iris blur. But from a contrast perspective, they are interchangeable.

Therefore, a variable, the so-called 'exposure', is defined as a combination of gain, shutter, iris and light. Since they should be interchangeable, $$exposure = gain + shutter + iris + light$$

This exposure variable would therefore make it possible to find a function $f_{prediction_{contrast}}$, such that:

$$S_{contrast} = f_{prediction_{contrast}}(exposure)$$

$f_{prediction_{contrast}}$ may be learned on the camera itself, so it does not matter if the definition of exposure is not universal. Even when a reference function for $f_{prediction_{contrast}}$ coming from another camera to start the method is used, an offset in exposure has no impact on the method, since offsets (translation errors) of the fprediction functions may be corrected by using the method for "predict improvement for each candidate".

In order to be able to use this formula, (gain, shutter, iris, light) need to be normalized. (gain, shutter, iris) are normalized through the parameters normalization step, in dB units. Therefore, the measure of the light also needs to refer to some normalized unit in dB The easiest way to define the light is to use the same function $f_{luminance}$ again and extend it to exposure instead of just gain, shutter and light, as a definition of light:

$$I = f_{luminance}(gain + iris + shutter + light)$$

$$light = f_{luminance}^{-1}(I) - (gain + shutter + iris)$$

It means that light here is defined through the relationship $I = f_{luminance}(gain + iris + shutter + light)$, making this relationship always true, by construction of the light variable. As a consequence, the light value of the scan measurements corresponds to light=0. It does not matter since the real value of exposure is not important. Only the deltas matter, and they are in dB units and are guaranteed to be correct, since the scales are normalized to make sure that *2 shutter is equivalent to +6 dB.

Following this formula, the light measurement workflow is shown in FIG. 10. It is worthwhile to note that if some parameters are not settable for a particular camera, or if it is decided to fix a parameter for simplicity reason, the corresponding parameter may be considered as a constant in the computation, so only a subset of the parameters are set. Consequently, the relationship here above may depend of only one parameter or a subset of parameters.

The disclosed method has some advantages.

The method uses a progressive approach (closed-loop-based) with both measurement and prediction. The prediction part decreases in favor of more accurate measurement part when approaching near the optimal setting. This approach guarantees to be close to optimal setting in all cases, even right after the first run of the system, when the prediction is the least accurate.

The scoring formulation guarantees convergence toward a better state at each iteration, even with some (limited) errors in the prediction.

The measurement-based $f_{prediction}$ updates guarantee to reach a perfect prediction over time. This learning capability prevents the need for any mathematical model with some assumptions, all is measurement-based at the end.

The preferred use of 1D $_{rediction}$ functions guarantees a fast, reliable convergence toward the final errorless prediction function.

When perfect prediction is reached, experiments show reliable instant auto setting in one or two iterations.

The parameters normalization based on universal shutter-based and time-based scaling guarantees cross model genericity.

Prediction updating and scene variables updating guarantees cross-scene genericity.

Each criterion is calculated independently of the others. Moreover, a very simple reduction formula (summation) is used and independent measurements are used to fuel a universal "state" with no prior assumptions. This guarantees cross-parameters, cross-artifact genericity.

It is very easy to add some new parameters to be auto-set, or new criteria to take into account. For example, for one new criterion, it is just needed to add one or multiple new required measurements in the state if not already existing, one $f_{estimation_{crit}}$ to be subjectively analyzed as a function of the new measurements, one $f_{prediction_{crit}}$ as a function of the required parameter, that will be updated until it is accurate, without any prior intervention.

No lengthy calibration is required, only some minimal, helper calibration to start with some data.

The algorithm works with any camera as soon as it is deployed, provided that the API of the camera is known.

Results are quite accurate even at start, then accuracy quickly improves even more, with time.

The algorithm adapts continuously to its environment, even if the scene changes (updates+forget mechanism).

Figure 11:
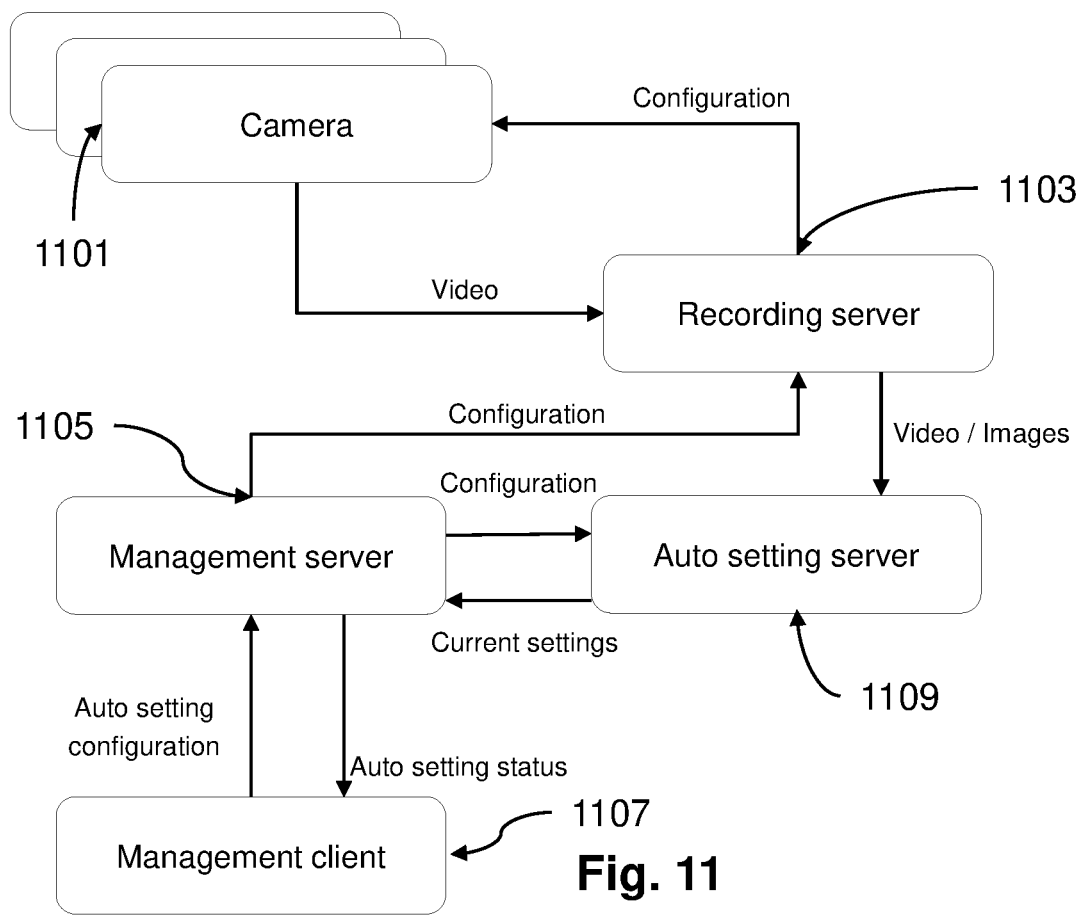
FIG. 11 illustrates a sample architecture for a system implementing the disclosed embodiments.

FIG. 11 shows a sample architecture for a system (such as a video surveillance system like Milestone XProtect) implementing the disclosed setting methods. This architecture comprises the following components:

Cameras 1101 that record video data;

A recording server 1103 that is connected to cameras and has an API to configure them; this server obtains video data from the cameras, records them and makes them available to other system components;

A management server 1105 that stores the system configuration and interacts with other components of the system to configure them (especially the recording server and the auto-setting server);

A management client 1107 that allows changing the configuration of the management server; as an example, this client may allow indicating that a given camera should be controlled by a given auto-setting algorithm; this client may also enable viewing status information regarding auto-setting execution;

An auto-setting server 1109, responsible for executing an auto-setting algorithm according to the disclosed embodiments for a number of cameras; the auto-setting server may be configured by the management server, which is itself controlled by a system administrator/users through the management client, depending on their user rights.

This architecture is an example of architecture. Each component may be implemented as different components. For instance, the auto-setting server could be implemented as two servers, either for a design reason (e.g., two different kinds of tasks are identified in the auto-setting algorithm, hence two servers are implemented, each one being responsible for a given task), or for a performance reason (e.g., to support a greater number of cameras).

In this example of architecture, the calibration data may for instance be stored in a database associated to the auto-setting server. In another implementation, if a database is already associated to the management server in order to store all configuration information, it may be more convenient to store calibration data in this database.

Figure 12:
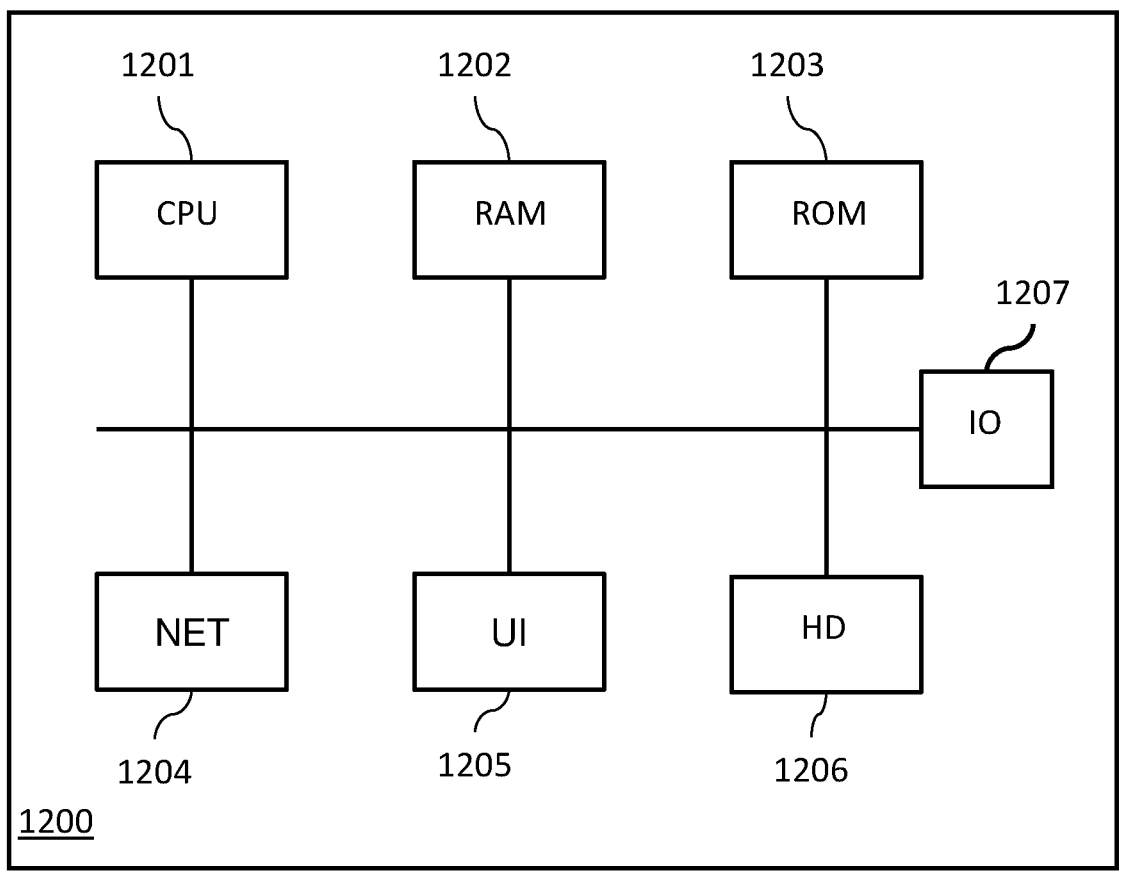
FIG. 12 illustrates a schematic block diagram of a computing device for implementation of the disclosed embodiments.

FIG. 12 is a schematic block diagram of a computing device 1200 for implementation of one or more embodiments of the invention. The computing device 1200 may be a device such as a microcomputer, a workstation or a light portable device. The computing device 1200 comprises a communication bus 1202 connected to:
- a central processing unit (CPU) 1204, such as a microprocessor;
- a random access memory (RAM) 1208 for storing the executable code of the embodiments of the disclosed methods as well as the registers adapted to record variables and parameters necessary for implementing the method for encoding pictures, the memory capacity thereof can be expanded by an optional RAM connected to an expansion port, for example;
- a read-only memory (ROM) 1206 for storing computer programs for implementing embodiments of the disclosed methods;
- a network interface 1212 that is, in turn, typically connected to a communication network 1214 over which digital data to be processed are transmitted or received. The network interface 1212 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1204;
- a user interface (UI) 1216 for receiving inputs from a user or to display information to a user;
- a hard disk (HD) 1210;
- an I/O module 1218 for receiving/sending data from/to external devices such as a video source or display.

The executable code may be stored either in read only memory 1206, on the hard disk 1210 or on a removable digital medium for example such as a disk. According to a variant, the executable code of the programs can be received by means of a communication network, via the network interface 1212, in order to be stored in one of the storage means of the communication device 1200, such as the hard disk 1210, before being executed.

The central processing unit 1204 is adapted to control and direct the execution of the instructions or portions of software code of the program or programs according to embodiments of the disclosed methods, which instructions are stored in one of the aforementioned storage means. After powering on, the CPU 1204 is capable of executing instructions from main RAM memory 1208 relating to a software application after those instructions have been loaded from the program ROM 1206 or the hard disk (HD) 1210, for example. Such a software application, when executed by the CPU 1204, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described herein above with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged or combined, where appropriate.

In the claims, the word "comprising" does not exclude other elements or steps, and the indefinite article "a" or "and" does not exclude a plurality. The mere fact that different features are recited in mutually different dependent claims does not indicate that a combination of these features cannot be advantageously used.

The invention claimed is:

1. A method for setting parameters values of a video source device, the method comprising:
   obtaining a value of an image characteristic for a current image generated by the video source device set with initial parameters values;
   determining a satisfaction level for the image characteristic of the current image based on the obtained value, the satisfaction level representing a probability to fulfil a task;
   obtaining a set of candidates, a candidate being defined as a set of parameters values, each candidate being different from the other candidates of the set by a different value of at least one parameter;
   for each candidate, predicting an evolution of the satisfaction level for the image characteristic relatively to the satisfaction level determined while the video source device is set with the initial parameters values;
   selecting a candidate based on its predicted evolution of the satisfaction level; and
   setting the parameters values of the video source device using the set of parameters values of the selected candidate,
   wherein there are a plurality of image characteristics, the satisfaction level is determined for each image characteristic of the plurality, and a score is determined that represents a combination of the evolution of each of the satisfaction levels for the plurality of image characteristics,
   wherein a first evolution of the satisfaction level for a given image characteristic is negative,
   wherein a second evolution of the satisfaction level for the given image characteristic is positive.

2. The method according to claim 1, wherein the method further comprises
   generating a predictive function defining the satisfaction level for the image characteristic as a function of at least one parameter of the video source device.

3. The method according to claim 2, wherein the input of the predictive function is a scalar resulting of one single parameter value or of a combination of a plurality of parameters values.

4. The method according to claim 2, wherein if the obtained value for the image characteristic is different from a value generated by the predictive function for a given set of parameters values, the predictive function is updated so that the value generated by the updated predictive function is equal to the obtained value.

5. The method according to claim 1, wherein predicting the evolution of the satisfaction level comprises predicting the value of the image characteristic based on a value of at least one parameter.

6. The method according to claim 1, wherein the combination is a weighted combination in which the weight for a high value of an evolution of a satisfaction level is less than the weight for a low value of an evolution of another satisfaction level.

7. The method according to claim 6,
wherein the first and second evolutions of the satisfaction level for the given image characteristic get a same absolute value;
wherein a weight associated to the first evolution of the satisfaction level is superior to a weight associated to the second evolution of the satisfaction level.

8. The method according to claim 1, wherein at least some parameters use different scales, wherein a normalization function is applied beforehand, thereby obtaining normalized parameters which use a same scale.

9. The method according to claim 8, wherein the contrast is an image characteristic that depends on exposure, wherein the exposure is defined as a sum of the normalized parameters values of the parameters among the list of gain, shutter and iris, alone or in combination, and of ambient light.

10. The method according to claim 9, wherein the normalized parameters values of gain, iris, shutter and ambient light are expressed in decibels (dB), such that the transition of a predetermined value in dB of any of gain, iris, shutter and/or ambient light creates a same evolution on luminance.

11. The method according to claim 10, wherein the ambient light of a scene captured by the video source device is computed using a luminance function based on a measured luminance of an image of the scene, and based on the normalized parameters values of the parameters for the image.

12. A non-transitory computer-readable medium comprising computer readable instructions which, when run on a computer, causes the computer to carry out a method for setting parameters values of a video source device, the method comprising:
obtaining a value of an image characteristic for a current image generated by the video source device set with initial parameters values;
determining a satisfaction level for the image characteristic of the current image based on the obtained value, the satisfaction level representing a probability to fulfil a task;
obtaining a set of candidates, a candidate being defined as a set of parameters values, each candidate being different from the other candidates of the set by a different value of at least one parameter;
for each candidate, predicting an evolution of the satisfaction level for the image characteristic relatively to the satisfaction level determined while the video source device is set with the initial parameters values;
selecting a candidate based on its predicted evolution of the satisfaction level; and
setting the parameters values of the video source device using the set of parameters values of the selected candidate,
wherein there are a plurality of image characteristics, the satisfaction level is determined for each image characteristic of the plurality, and a score is determined that represents a combination of the evolution of each of the satisfaction levels for the plurality of image characteristics,
wherein a first evolution of the satisfaction level for a given image characteristic is negative,
wherein a second evolution of the satisfaction level for the given image characteristic is positive.

13. A device comprising a processing unit configured for carrying out each of the steps of a method for setting parameters values of a video source device, the method comprising:
obtaining a value of an image characteristic for a current image generated by the video source device set with initial parameters values;
determining a satisfaction level for the image characteristic of the current image based on the obtained value, the satisfaction level representing a probability to fulfil a task;
obtaining a set of candidates, a candidate being defined as a set of parameters values, each candidate being different from the other candidates of the set by a different value of at least one parameter;
for each candidate, predicting an evolution of the satisfaction level for the image characteristic relatively to the satisfaction level determined while the video source device is set with the initial parameters values;
selecting a candidate based on its predicted evolution of the satisfaction level; and
setting the parameters values of the video source device using the set of parameters values of the selected candidate,
wherein there are a plurality of image characteristics, the satisfaction level is determined for each image characteristic of the plurality, and a score is determined that represents a combination of the evolution of each of the satisfaction levels for the plurality of image characteristics,
wherein a first evolution of the satisfaction level for a given image characteristic is negative,
wherein a second evolution of the satisfaction level for the given image characteristic is positive.

* * * * *